Patented May 28, 1946

2,401,090

UNITED STATES PATENT OFFICE 2,401,090

DRY SIZE COMPOSITIONS

Robert T. Mashburn, Parchment, Mich., assignor to Hercules Powder Company, Wilmington, Del., a corporation of Delaware No Drawing. Application June 14, 1941,
Serial No. 398,024

9 Claims. (Cl. 106—144)

This invention relates to sizing compositions, and in particular concerns dry rosin size compositions suitable or use in preparing aqueous sizing dispersions containing a high proportion of free rosin.

Although the paper-making art has for many years in the past employed aqueous solutions or dispersions of saponified rosin almost exclusively for sizing purposes, with the acceptance in recent years of the so-called "free rosin theory" of sizing it has been realized that improved sizing efficiency and substantial manufacturing economies could be realized by the use of rosin size dispersions in which a high proportion of the rosin, e. g., 70–100 per cent, is present in free, i. e., unsaponified, form.

Accordingly, a number of sizing compositions of this general type have been proposed, and while several of such compositions have enjoyed moderate commercial usage, they have certain disadvantages which limit their general acceptance throughout the paper-making art. For example, it has been proposed in U. S. Patent No. 1,882,680 to prepare high free rosin size dispersions by agitating molten rosin with an aqueous alkaline solution of a protective colloid such as casein. Such dispersions, however, have the great disadvantage of being entirely unstable to freezing, and accordingly their shipment during winter weather in northern climates becomes impossible. They have the further disadvantage in that they are usually shipped at a solids concentration of about 40–50 per cent by weight, thereby necessitating the expense of transporting large quantities of water.

I have now found that the aforementioned difficulties may be overcome by providing dry rosin size compositions which are readily adapted to being dispersed in water to form high free rosin size dispersions just prior to use in the paper mill. More specifically, I have found that a fused mixture of rosin, a protective colloid, and a small proportion of a water-soluble alkali may be readily dispersed in water with the aid of an efficient stirring device to form high free rosin dispersions which are at least equal in sizing efficiency to the sizing dispersions of this type previously employed and have excellent stability to floccing upon dilution with hard water. Such dry mixture is entirely unaffected by exposure to freezing temperatures and is more economical to ship by reason of its being substantially free from water.

The rosin employed in preparing the new dry size compositions may be any of the grades of refined wood or gum rosin, or it may be a mixture of gum and wood rosins. Alternatively, it may be a rosin which has been subjected to heat-treatment to reduce its tendency to crystallize, or it may be a rosin which has been hydrogenated to render it stable to discoloration or oxidation in the air.

The protective colloid employed is preferably a proteinaceous material, such as milk casein, egg albumin, soya bean protein, etc., although other colloidal substances, such as gum arabic, starch, water-soluble methyl cellulose, etc., may be employed if desired. Dry sodium caseinate, such as is prepared by dissolving milk casein in aqueous sodium hydroxide and thereafter evaporating the resulting solution to dryness, has been found to be particularly suitable because of its convenience in handling. The protective colloid is usually employed in amounts between about 1 and about 25 per cent, preferably between about 3 and about 10 per cent, by weight of the rosin, although somewhat larger proportions may be employed if desired.

The alkali ingredient of the new dry size compositions is preferably an alkali-metal hydroxide, such as sodium or potassium hydroxide, although other strong water-soluble alkalies, such as sodium carbonate, may be used. It is usually employed in an amount about 0.5 and between about 5 per cent by weight of the rosin, and is conveniently handled in the form of a concentrated aqueous solution.

According to a preferred mode of preparing the dry-size compositions provided by the invention, the rosin is melted and the protective colloid and alkali are gradually stirred into the molten mass until a homogeneous composition is obtained. Upon cooling, the composition is a hard, resin-like material which can readily be broken up and packaged in the same manner as rosin. It is entirely stable to decomposition or degradation upon storage at atmospheric temperatures over long periods of time.

As hereinbefore stated, the dry-size compositions of the present invention are readily dispersed in water to form aqueous sizing dispersions adapted to being added directly to the beating engine in the paper-making process. The dispersing operation may be carried out simply by melting the dry material and thereafter gradually adding the desired amount of water to the molten mass with vigorous agitation, such as that provided by a high-speed propeller-type agitator. The solids concentration of the dispersions so prepared may be varied between wide limits according to the particular requirements of the manner in which it is used, but is ordinarily between about 25 and about 50 per cent by weight.

The following example will illustrate one way in which the principle of the invention has been applied, but is not to be construed as limiting the same:

*Example*

Approximately 100 parts of refined wood rosin were placed in a kettle and melted by heating to a temperature of about 100° C., after which a solution of 1.8 parts of sodium hydroxide in 3.6 parts of water, and 5 parts of dry sodium caseinate were stirred into the molten rosin. Stirring was continued for several minutes to insure a homogeneous composition and the mixture was then allowed to cool. The composition so prepared was a hard, brittle material having the general appearance and color of rosin. A typical size dispersion was prepared from this material by melting it and thereafter gradually adding 118 parts of water while stirring with a high speed propeller-type stirrer. The resulting dispersion contained approximately 46.3 per cent by weight of solids, and approximately 85 per cent by weight of the rosin was present in free form as determined by direct titration.

The following table presents data illustrating the sizing efficiency of the above-described dispersion in comparison with that of several typical commercial dispersions. In the table, the data in Experiments 1 and 2 were obtained employing a beater furnish comprising 750 pounds of bleached sulfite pulp and 750 pounds of washed stock, and employing sufficient of the sizing dispersion to provide 19.4 pounds of rosin. The sizing dispersion was added to the beater, after which sufficient alum was added to maintain a pH of about 4.0–4.3, and the sized furnish was run off on a Fourdrinier machine at a rate of about 235 feet per minute. After drying and conditioning, samples of the paper so prepared were subjected to the tests indicated in the table. The data in Experiments 3 and 4 were obtained with a somewhat different beater furnish. All of the values in said table represent the average of separate determinations on at least four separate samples of the paper.

homogeneous mixture consisting essentially of molten rosin, a water- or alkali-soluble protective colloid, and between about 0.5% and about 5% by weight of the rosin of a water-soluble alkali metal alkali, said product being a hard, brittle material having the general appearance and color of rosin and being stable to decomposition and degradation upon storage over long periods of time.

2. A dry rosin size composition readily dispersible in water to provide an aqueous sizing dispersion containing a high proportion of free rosin, comprising the solidified product of a homogeneous mixture consisting essentially of molten rosin, a protective proteinaceous colloid, and between about 0.5% and about 5% by weight of the rosin of a water-soluble alkali metal alkali, said product being a hard, brittle material having the general appearance and color of rosin and being stable to decomposition and degradation upon storage over long periods of time.

3. A dry rosin size composition readily dispersible in water to provide an aqueous sizing dispersion containing a high proportion of free rosin, comprising the solidified product of a homogeneous mixture consisting essentially of molten rosin, a water- or alkali-soluble protective colloid, and between about 0.5% and about 5% by weight of the rosin of sodium hydroxide, said product being a hard, brittle material having the general appearance and color of rosin and being stable to decomposition and degradation upon storage over long periods of time.

4. A dry rosin size composition readily dispersible in water to provide an aqueous sizing dispersion containing a high proportion of free rosin, comprising the solidified product of a homogeneous mixture consisting essentially of molten rosin, between about 1% and about 25% by weight of the rosin of a water- or alkali-soluble protective colloid and between about 0.5% and about 5% by weight of the rosin of a water-soluble alkali metal alkali, said product being a hard, brittle material having the general appearance and color of rosin and being stable to decomposition and degradation upon storage over long periods of time.

5. A dry rosin size composition readily dispersible in water to provide an aqueous sizing dispersion containing a high proportion of free Table

| Expt. No. | Size dispersion | Basis weight, lbs. (500 24 x 36 sheets) | Gurley densometer porosity, secs. | Ink flotation, secs. | Ash, percent | Water penetration, secs. |
|---|---|---|---|---|---|---|
| 1 | Prepared as herein described | 60.0 | 22.5 | 310 | 6.3 | |
| 2 | Commercial paste size containing 25% free rosin | 59.9 | 22.1 | 197 | 7.1 | |
| 3 | Prepared as herein described | ¹ 31.6 | 93 | | | 14.4 |
| 4 | Commercial high free rosin size dispersion | ¹ 31.4 | 87 | | | 14.0 |

¹ 480 24 x 36 sheets.

Other modes of applying the principle of my invention may be employed instead of those explained, change being made as regards the method herein disclosed or the materials employed, provided the product stated by any of the following claims or the equivalent of such stated product be obtained.

What I claim and desire to protect by Letters Patent is:

1. A dry rosin size composition readily dispersible in water to provide an aqueous sizing dispersion containing a high proportion of free rosin, comprising the solidified product of a rosin, comprising the solidified product of a homogeneous mixture consisting essentially of molten rosin, sodium caseinate, and between about 0.5% and about 5% by weight of the rosin of sodium hydroxide, said product being a hard, brittle material having the general appearance and color of rosin and being stable to decomposition and degradation upon storage over long periods of time.

6. A dry rosin size composition readily dispersible in water to provide an aqueous sizing dispersion containing a high proportion of free rosin, comprising the solidified product of a homogeneous mixture consisting essentially of molten rosin, between about 1% and about 25% by weight of the rosin of sodium caseinate, and between about 0.5% and about 5% by weight of the rosin of sodium hydroxide, said product being a hard, brittle material having the general appearance and color of rosin and being stable to decomposition and degradation upon storage over long periods of time.

7. A dry rosin size composition readily dispersible in water to provide an aqueous sizing dispersion containing a high proportion of free rosin, comprising the solidified product of a homogeneous mixture consisting essentially of molten rosin, and alkali metal salt of soybean protein, and between about 0.5% and about 5% by weight of the rosin of a water-soluble alkali metal alkali, said product being a hard, brittle material having the general appearance and color of rosin and being stable to decomposition and degradation upon storage over long periods of time.

8. A dry rosin size composition readily dispersible in water to provide an aqueous sizing dispersion containing a high proportion of free rosin, comprising the solidified product of a homogeneous mixture consisting essentially of molten rosin, a water-soluble protective colloid, and between about 0.5% and about 5% by weight of the rosin of sodium carbonate, said product being a hard, brittle material having the general appearance and color of rosin and being stable to decomposition and degradation upon storage over long periods of time.

9. A dry rosin size composition readily dispersible in water to provide an aqueous sizing dispersion containing a high proportion of free rosin, comprising the solidified product of a homogeneous mixture consisting essentially of molten rosin, between about 3% and about 10% by weight of the rosin of sodium caseinate, and between about 0.5% and about 5% by weight of the rosin of sodium hydroxide, said product being a hard, brittle material having the general appearance and color of rosin and being stable to decomposition and degradation upon storage over long periods of time.

ROBERT T. MASHBURN.